United States Patent
Satori et al.

(10) Patent No.: US 7,037,623 B2
(45) Date of Patent: May 2, 2006

(54) NONAQUEOUS SECONDARY BATTERY, METHOD FOR MAKING NEGATIVE ELECTRODE COMPONENT THEREFOR, AND APPARATUSES FOR EVALUATING AND MAKING GRAPHITE MATERIAL FOR NEGATIVE ELECTRODE COMPONENT

(75) Inventors: Kotaro Satori, Kanagawa (JP); Akinori Kita, Kanagawa (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 10/310,562

(22) Filed: Dec. 4, 2002

(65) Prior Publication Data

US 2003/0095913 A1 May 22, 2003

Related U.S. Application Data

(62) Division of application No. 09/514,590, filed on Feb. 28, 2000, now Pat. No. 6,506,519.

(30) Foreign Application Priority Data

Mar. 2, 1999 (JP) ............................. P11-054459

(51) Int. Cl.
*C01B 31/04* (2006.01)

(52) U.S. Cl. .................................. 429/231.8; 423/448

(58) Field of Classification Search ............ 423/445 R, 423/448; 429/231.8; 502/101
See application file for complete search history.

(56) References Cited

U.S. PATENT DOCUMENTS 5,312,611 A * 5/1994 Takami et al. ........... 423/447.6

* cited by examiner

*Primary Examiner*—Stuart Hendrickson
(74) *Attorney, Agent, or Firm*—Sonnenschein, Nath & Rosenthal LLP

(57) ABSTRACT

A negative electrode of a nonaqueous secondary battery is formed of a carbonaceous material. The ratio RG=Gs/Gb of the degree of graphitization Gs of the carbonaceous material, determined by a surface-enhanced Raman spectrum, to the degree of graphitization Gb, determined by a Raman spectrum measured using argon laser light, is at least 4.5. Alternatively, the carbonaceous material has a peak in a wavelength range above 1,360 $cm^{-1}$ in a surface-enhanced Raman spectrum which is measured by the same surface-enhanced Raman spectrum. The deterioration of the nonaqueous secondary battery is suppressed during use in high-temperature environments and high capacity is maintained for long periods.

2 Claims, 2 Drawing Sheets

NONAQUEOUS SECONDARY BATTERY, METHOD FOR MAKING NEGATIVE ELECTRODE COMPONENT THEREFOR, AND APPARATUSES FOR EVALUATING AND MAKING GRAPHITE MATERIAL FOR NEGATIVE ELECTRODE COMPONENT

The present application is a divisional of U.S. patent application Ser. No. 09/514,590 filed Feb. 28, 2000 now U.S. Pat. No. 6,506,519.

BACKGROUND OF THE INVENTION

1. Field of the Invention

The present invention relates to a secondary battery using a nonaqueous electrolyte solution (hereinafter referred to as a "nonaqueous secondary battery"), a method for making a negative electrode component used in the nonaqueous secondary battery, an apparatus for evaluating a graphite material for the negative electrode component, and an apparatus for making the graphite material.

2. Description of the Related Art

As rapid progress is made in the miniaturization of electronic devices, such as portable phones and notebook personal computers, secondary batteries are required to have higher energy densities.

In conventional secondary batteries, such as lead batteries, Ni—Cd batteries, and Ni-MH batteries, discharge voltages are low and energy densities are insufficient. Lithium secondary batteries are also used in practice, in which metallic lithium, lithium alloys, and carbonaceous materials which can electrochemically occlude and release lithium ions are used as negative electrode active materials, and various positive electrodes are used. The lithium secondary batteries have high output voltages and thus have large energy densities per weight or volume compared to the above conventional batteries.

In the lithium secondary batteries at initial stages, metallic lithium and lithium alloys are used as negative electrodes. A negative electrode using metallic lithium or a lithium alloy is insufficient in charge-discharge efficiency and has a problem in that dendritic lithium is formed. Thus, such negative electrodes are used in practice only in a few specialized fields.

Carbonaceous materials which can electrochemically occlude and release lithium ions have recently been anticipated as negative electrode components and are now coming into use. Negative electrodes using the carbonaceous materials do not have problems inherent in the metallic lithium or lithium alloys, that is, the formation of metallic lithium having a dendritic structure and particularization of the lithium alloy during charge-discharge cycles. Moreover, the carbonaceous materials show high coulomb efficiency; hence, lithium secondary batteries having carbonaceous negative electrodes exhibit superior charge-discharge reversibility.

In secondary batteries using the carbonaceous materials as negative electrode active materials, metallic lithium is not precipitated in use. Thus, lithium secondary batteries using the carbonaceous materials and nonflammable lithium compound oxide are safe and are commercially produced. These batteries are called "lithium ion batteries" and use carbonaceous materials as negative electrodes, $LiCoO_2$ as positive electrodes, and nonaqueous electrolyte solutions containing nonaqueous solvents.

Carbonaceous materials used as negative electrodes are classified into graphite materials including natural products and artificial products, easily-graphitizable carbonaceous materials as precursors of artificial graphite materials, and ungraphitizable carbonaceous materials which are not converted to graphite even when these are treated at high temperatures facilitating the formation of graphite. Graphite materials and ungraphitizable carbonaceous materials have high capacities as negative electrodes and are thus currently used.

Lithium ion batteries have rapidly gained widespread use as electrical power sources in electronic devices, particularly, notebook personal computers due to compact, because they are lightweight, and have high capacities. Notebook personal computers having improved performance require higher,CPU clock frequencies. Thus, high-performance computers consume significant amounts of electrical power and generate substantial amounts of heat during operation. Moreover, the restricted volume of dead space, which is inherent in miniaturization of personal computers, precludes the dissipation of heat which is generated during operation, resulting in an increase in the internal temperatures of personal computers.

The increased temperature accelerates deterioration and thus decreases capacity in batteries used in personal computers. The lost capacity cannot be restored by any means.

SUMMARY OF THE INVENTION

Accordingly, it is an object of the present invention to provide a lithium ion secondary battery which does not cause deterioration by generating excessive heat, has high capacity, and is highly reliable in use.

It is another object of the present invention to provide a method for making a negative electrode component used in a nonaqueous secondary battery, an apparatus for evaluating a graphite material as the negative electrode component, and an apparatus for making the graphite material.

According to experimental results obtained by the present inventors, a lithium ion secondary battery using a carbonaceous material for a negative electrode, which has specific structural parameters, can maintain high capacity even after such a battery is stored in high-temperature environments, and has high capacity reliability for long periods.

According to a first aspect of the present invention, a nonaqueous secondary battery includes a negative electrode including a carbonaceous material in which the ratio $RG=Gs/Gb$ of the degree of graphitization Gs of the carbonaceous material, determined by a surface-enhanced Raman spectrum, to the degree of graphitization Gb, determined by a Raman spectrum measured using argon laser light, is at least 4.5, based on the following conditions:

$Gb=Hbb/Hba$; and $Gs=Hsb/Hsa$;

wherein Hba is the height of a peak lying in a range of 1,580 $cm^{-1}$ to 1,620 $cm^{-1}$ in a Raman spectrum which is measured using an argon laser Raman spectrometer of a wavelength of 514.5 nm and a wavelength resolution of 4 $cm^{-1}$;

Hbb is the height of a peak lying in a range of 1,350 $cm^{-1}$ to 1,400 $cm^{-1}$ in a Raman spectrum which is measured using an argon laser Raman spectrometer of a wavelength of 514.5 nm and a wavelength resolution of 4 $cm^{-1}$;

Hsa is the height of a peak lying in a range of 1,580 $cm^{-1}$ to 1,620 $cm^{-1}$ in a surface-enhanced Raman spectrum which is measured using an argon laser Raman spectrometer of a wavelength of 514.5 nm and a wavelength resolution of 4 cm$^{-1}$ when silver having a thickness of 10 nm is deposited on the carbonaceous material; and Hsb is the height of a peak lying in a range of 1,350 cm$^{-1}$ to 1,400 cm$^{-1}$ in a surface-enhanced Raman spectrum which is measured using an argon laser Raman spectrometer of a wavelength of 514.5 nm and a wavelength resolution of 4 cm$^{-1}$ when silver having a thickness of 10 nm is deposited on the carbonaceous material.

According to a second aspect of the present invention, a nonaqueous secondary battery includes a negative electrode including a carbonaceous material having a peak in a wavelength range above 1,360 cm$^{-1}$ in a surface-enhanced Raman spectrum which is measured using an argon laser Raman spectrometer of a wavelength of 514.5 nm and a wavelength resolution of 4 cm$^{-1}$ when silver having a thickness of 10 nm is deposited on the carbonaceous material.

In the nonaqueous secondary battery according to the first aspect and second aspect, the carbonaceous material is preferably graphite.

The nonaqueous secondary battery further includes a positive electrode, which preferably includes a lithium compound oxide represented by $LiM_xO_y$, wherein M is at least one element selected from the group consisting of Co, Ni, Mn, Fe, Cr, Al, and Ti.

According to a third aspect of the present invention, a method for making a negative electrode component used in the nonaqueous secondary battery according to the first aspect, includes the steps of carbonizing a raw material, slightly oxidizing the surface of the carbonized material, and then graphitizing the oxidized material.

According to a fourth aspect of the present invention, a method for making a negative electrode component used in the nonaqueous secondary battery according to the second aspect, includes the steps of carbonizing a raw material, slightly oxidizing the surface of the carbonized material, and then graphitizing the oxidized material.

According to a fifth aspect of the present invention, a method for making a negative electrode component used in the nonaqueous secondary battery according to the first aspect, includes the step of polishing the surface of the negative electrode component by irradiating the surface with light.

According to a sixth aspect of the present invention, a method for making a negative electrode component used in the nonaqueous secondary battery according to the second aspect, includes the step of polishing the surface of the negative electrode component by irradiating the surface with light.

According to a seventh aspect of the present invention, a method for making a negative electrode component used in the nonaqueous secondary battery according to the first aspect, includes the step of annealing natural graphite having a rhombic structure at a temperature of at least 2,000° C.

According to an eighth aspect of the present invention, a method for making a negative electrode component used in the nonaqueous secondary battery according to the second aspect, includes the step of annealing natural graphite having a rhombic structure at a temperature of at least 2,000° C.

According to a ninth aspect of the present invention, an apparatus for evaluating a graphite material includes a surface-enhanced Raman spectroscopic means.

According to a tenth aspect of the present invention, an apparatus for evaluating a graphite material used in a nonaqueous secondary battery, determines whether the ratio RG=Gs/Gb of the degree of graphitization Gs of the carbonaceous material, determined by a surface-enhanced Raman spectrum, to the degree of graphitization Gb, determined by a Raman spectrum measured using argon laser light, is at least 4.5, based on the conditions described in the first aspect.

According to an eleventh aspect of the present invention, an apparatus for evaluating a graphite material used in a nonaqueous secondary battery, determines if the graphite material has a peak in a wavelength range above 1,360 cm$^{-1}$ in a surface-enhanced Raman spectrum which is measured using an argon laser Raman spectrometer of a wavelength of 514.5 nm and a wavelength resolution of 4 cm$^{-1}$ when silver having a thickness of 10 nm is deposited on the carbonaceous material.

According to a twelfth aspect of the present invention, an apparatus for making a graphite material includes an apparatus for evaluating a graphite material according to the ninth aspect.

According to a thirteenth aspect of the present invention, an apparatus for making a graphite material includes an apparatus for evaluating a graphite material according to the tenth aspect.

According to a fourteenth aspect of the present invention, an apparatus for making a graphite material includes an apparatus for evaluating a graphite material according to the eleventh aspect.

The method for measuring the structural parameters characterized by the present invention is described below. The structural parameters are determined by Raman spectroscopy. The Raman spectrum of a conventional carbonaceous material has a peak Pba in a range of 1,580 cm$^{-1}$ to 1,620 cm$^{-1}$ assigned to a graphite crystal structure and a peak Pbb in a range of 1,350 cm$^{-1}$ to 1,400 cm$^{-1}$ assigned to an amorphous structure. When the graphite structure is disordered, the intensity Hba of the peak Pba decreases, whereas the intensity Hbb of the peak Pbb increases. Thus, the ratio of the height Hba to the height Hbb represents the degree of graphitization.

Surface-enhanced Raman spectrometry (SERS) was developed by Fleischmann et al. in 1974. In this method, a thin metal layer is deposited on the surface of a sample to be measured. This method is characterized by uppermost surface analysis on the order of several nanometers and enhanced Raman sensitivity. A surface-enhanced Raman spectrum is substantially the same as the corresponding conventional Raman spectrum, although the analytical depth differs between these methods. That is, the surface-enhanced Raman spectrum has a peak Pba in a range of 1,580 cm$^{-1}$ to 1,620 cm$^{-1}$ assigned to a graphite crystal structure and a peak Pbb in a range of 1,350 cm$^{-1}$ to 1,400 cm$^{-1}$ assigned to an amorphous structure. The ratio of the intensity (height Hba) of the peak Psa to the intensity (height Hbb) of the peak Psb represents the degree of graphitization at the topmost layer.

The carbonaceous material for the negative electrode component in the nonaqueous secondary battery in accordance with the present invention is characterized by the ratio of the intensities measured by the two types of Raman spectroscopy, and the capacity of the battery can be maintained even after the battery is stored in high-temperature environments.

Such a carbonaceous material can be produced by the method for making the negative electrode component in accordance with the present invention.

The apparatus for evaluating the graphite material including a surface-enhanced Raman spectrometer can evaluate the graphite material before a battery is fabricated using the graphite material.

The apparatus for making the graphite material including the apparatus for evaluating the graphite material contributes to improved quality control in the manufacturing process, optimization of the process, and increasing the rate of development of the graphite material.

DESCRIPTION OF THE PREFERRED EMBODIMENT

Figure 1:
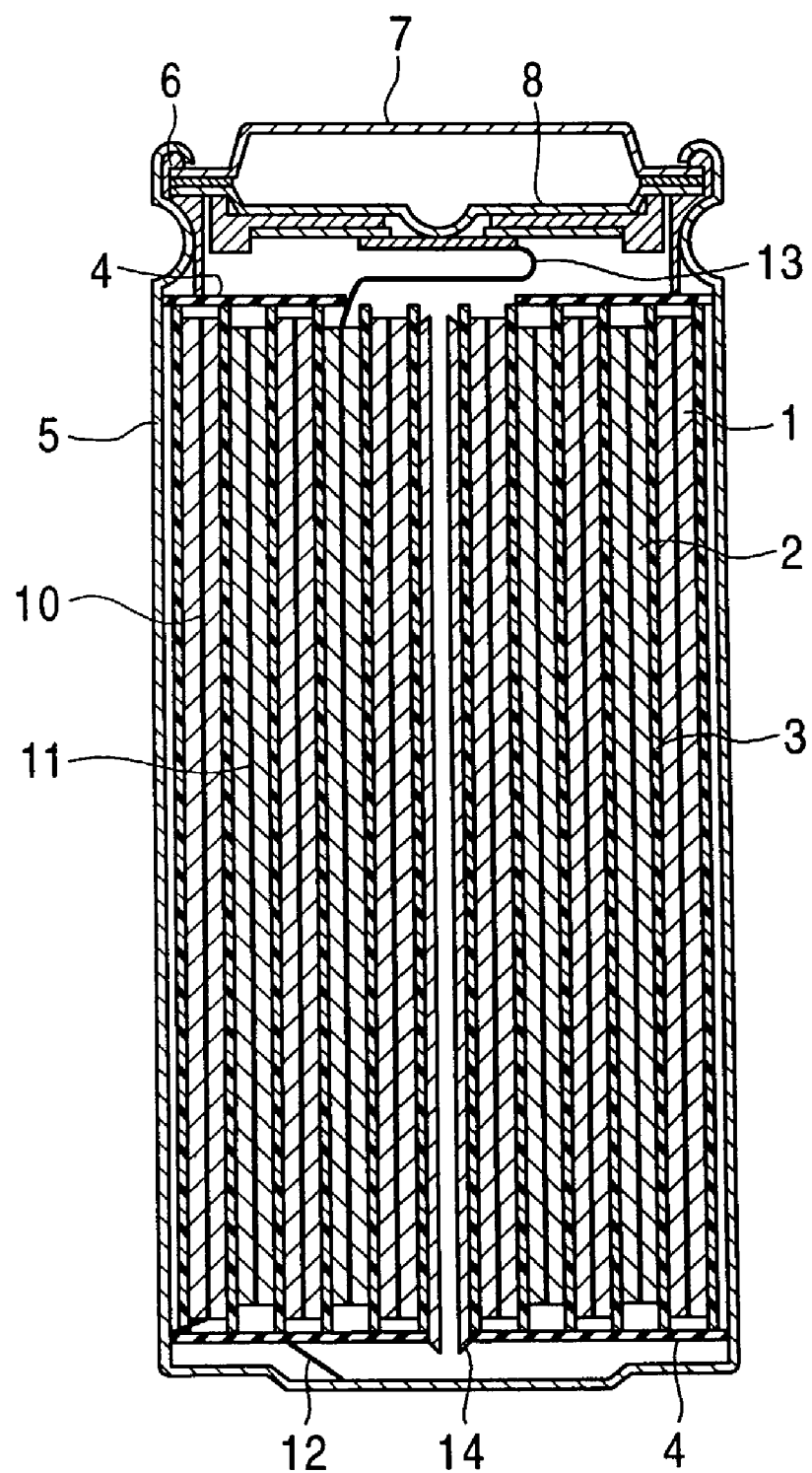
FIG. 1 is a cross-sectional view of a cylindrical nonaqueous secondary battery containing a spiral electrode element in accordance with the present invention.

Any carbonaceous material which satisfies the above-described structural parameters can be used in the present invention. Preferred carbonaceous materials in the present invention are graphite materials which are classified into natural graphite derived from ore and artificial graphite which is formed by heating an organic material to a high temperature of at least 2,000° C.

Examples of organic materials include coal and pitch. Examples of pitches include tars which are formed by high-temperature pyrolysis of coal tar, ethylene bottom oil, and crude oil; products which are formed by distillation (vacuum distillation, normal-pressure distillation, and steam distillation), thermal condensation polymerization, extraction, and chemical condensation polymerization of asphalt; and pitches formed by coking wood. Examples of starting materials for pitch include polyvinyl chloride resins, polyvinyl acetate resins, polyvinyl butyral resin, and 3,5-dimethylphenyl resins. The coal and pitch are present in a liquid state at up to 400° C. in the carbonization process, aromatic rings are polymerized, fused, and stacked at this temperature, and then semicokes as precursors of carbonaceous materials are formed at a temperature of 500° C. or more. This process is called liquid-phase carbonization and is a typical process for forming graphitizable carbon.

Examples of other useful starting materials include fused-ring polycyclic compounds, e.g., naphthalene, phenanthrene, anthracene, triphenylene, pyrene, perylene, pentaphene, pentacene, and derivatives thereof, e.g., carboxylic acids, carboxylic anhydrides, and carboxylic imides thereof; fused-ring heterocyclic compounds, e.g., acenaphthylene, indole, isoindole, quinoline, isoquinoline, quinoxaline, phthalazine, carbazole, acridine, phenazine, phenanthridine, and derivatives thereof.

A desired artificial graphite can be produced using one of the above organic materials as a starting material, for example, as follows. The organic material is carbonized at 300 to 700° C. in a stream of an inert gas, such as nitrogen, is heated to 900 to 1,500° C. at a heating rate of 1 to 100° C./min in the inert gas stream, is calcined at this temperature for 0 to 30 hours, and is then subjected to high-temperature heat treatment at a temperature of at least 2,000° C. and preferably 2,500° C. Carbonization and calcination may be omitted in some cases. The resulting carbonaceous or graphitic materials are pulverized and then classified before the material is used in a negative electrode component. Pulverization is preferably performed prior to carbonization, calcination, and high-temperature heat treatment.

A material which is preferable for use in practice is a graphite material having a true density of at least 2.1 g/cm$^3$ and a bulk density of at least 0.4 g/cm$^3$. Since the graphite material has a high true density, a negative electrode using the graphite material has a high packaging density, resulting in improved energy density when used in batteries. When a graphite material is used having a bulk density of at least 0.4 g/cm$^3$, the graphite material is homogeneously dispersed in a negative electrode compound, and thus cycle characteristics are improved. When a graphite material is used having a bulk density of 0.4 g/cm$^3$ and a high flatness represented by an average shape factor $x_{ave}$ of 125 or less, the electrode has an ideal structure and exhibits satisfactory cycle characteristics.

In order to produce such a graphite material, a molded carbon article is preferably subjected to the heat treatment for graphatization. This graphitized molded article is pulverized to form a graphite material having a higher bulk density and a lower average shape factor $x_{ave}$. When the pulverized graphite material has a bulk density of 9 m$^2$/g or less in addition to the above parameters, the number of fine submicron particles adhering onto graphite particles is reduced. Thus, the bulk density is increased, and the electrode has an ideal structure exhibiting further improved cycle characteristics.

The reliability of the nonaqueous secondary battery is further improved when pulverized graphite is used having a 10% cumulative particle size of 3 μm, a 50% cumulative particle size of 10 μm, and a 90% cumulative particle size of 70 μm according to a particle size distribution by laser diffractometry.

Small particles have large specific areas and cause extraordinary amounts of heat generation when the secondary battery is overcharged. Since the amount of particles of small size is restricted in the present invention, the extraordinary heat generation does not occur in an overcharged state. Also, the amount of particles of large size is also restricted in the present invention, hence, expansion of particles at the initial charging operation can be suppressed. Thus, the nonaqueous secondary battery does not cause internal short-circuiting due to the expansion of particles, and is very safe and reliable in practical use.

The use of graphite particles having an average fracture strength of at least 6.0 kgf/mm$^2$ causes the formation of numerous pores which can contain the electrolyte solution in the electrode formed of the graphite. As a result, the nonaqueous secondary battery exhibits satisfactory load characteristics.

A method for making the above-described carbonaceous material in accordance with the present invention will now be described.

The production of artificial graphites is described below. Various types of pitch formed from petroleum and coal can be used as raw materials for precursors of the artificial graphite. The pitch is heated to 400 to 500° C. to form a carbonaceous precursor, and the resulting precursor is heated to 800 to 1,000° C. in an atmosphere of inert gas. The product is pulverized and classified so as to have the above-specified particle size. The resulting particles are heated to a predetermined temperature in an atmosphere of reactive gas to slightly oxidize the surfaces thereof and are then heated to a higher temperature in an atmosphere of inert gas to graphitize the particles. The artificial graphite in accordance with the present invention is thereby formed.

Any reactive gas reactive with carbon may be used. Examples of preferred reactive gases include oxygen, ozone, carbon dioxide, chlorine, hydrochloric acid, sulfur dioxide, and $NO_x$. The reaction temperature can be determined according to the type of gas used and is preferably room temperature to 500° C. The graphitized particles are preferably irradiated with intense light such as laser light to remove or polish the surface unevenness of the particles so that the artificial graphite satisfies the above-described requirements.

The processing of natural graphite will be described below. When the natural graphite is pulverized under appropriate conditions, a rhombic crystal structure is formed. The pulverized graphite is heated to 2,000° C. or more to form the carbonaceous material in accordance with the present invention. The content of the rhombic structure can be determined by X-ray diffractometry and is in a range of preferably 1% to 40% and more preferably 5% to 30%.

The materials for the positive electrode used in a combination of the above negative electrode preferably contain a sufficient amount of Li. Examples of preferable materials include lithium compound oxides represented by the general formula $LiMO_2$ wherein M is at least one transition metal selected from the group consisting of Co, Ni, Mn, Fe, Al, V, and Ti, and interlayer compounds containing lithium.

The nonaqueous electrolyte solution used in the nonaqueous secondary battery in accordance with the present invention is composed of an electrolyte and nonaqueous solvents. In the present invention, the nonaqueous solvents are composed of a first solvent having a relatively high dielectric constant, such as ethylene carbonate (EC), and an additional solvent as a low-viscosity component.

Examples of the first solvents having high dielectric constants include propylene carbonate (PC), butylene carbonate, vinylene carbonate, sulfolane and derivatives thereof, butyrolactone and derivatives thereof, and valerolactone and derivatives thereof.

Examples of preferred low-viscosity solvents include symmetric or asymmetric linear carbonate esters, e.g., diethyl carbonate, dimethyl carbonate, methyl ethyl carbonate, and methyl propyl carbonate. A combination of at least two low-viscosity solvents is more preferable.

When the graphite material is used in the negative electrode, preferred first nonaqueous solvents are EC and halogenated EC. It is preferable that a second high-dielectric solvent, such as PC, be partially substituted for EC and/or halogenated EC in order to further improve characteristics of the nonaqueous secondary battery, even though PC is reactive with the graphite material.

Examples of the second high-dielectric solvents include PC, butylene carbonate, 1,2-dimethoxyethane, 1,2-diethoxydrofuran, γ-butyrolactone, valerolactone, tetrahydrofuran, 2-methyltetrahydrofuran, 1,3-dioxolane, 4- methy-1,3-dioxolane, sulfolane, and methylsulfolane. The content of the second high-dielectric solvents is preferably less than 10 percent by volume.

In the present invention, a third solvent may be added to the first solvent which may contain the second solvent, as described above, in order to improve conductivity and low-temperature characteristics, to suppress decomposition of EC, and to suppress reactivity of the solvent mixture with lithium so as to ensure the safety of the secondary battery. Examples of preferred third solvents are linear carbonate esters, such as diethyl carbonate (DEC) and dimethyl carbonate (DMC); and asymmetric linear carbonate esters, such as methyl ethyl carbonate (MEC) and methyl propyl carbonate (MPC).

The ratio by volume of the third solvent to the first solvent which may contain the second solvent, that is, (the first solvent+optional second solvent):(third solvent) is preferably 15:85 to 40:60 and more preferably 18:82 to 35:65. The third solvent may be a mixture of MEC and DMC. The MEC-DMC ratio in the mixed third solvent is preferably in a range of $1/9 \leq d/m \leq 8/2$ wherein d represents the volume of MEC and m represents the volume of DMC.

When the third solvent is a mixture of MEC and DMC, the amount (m+d) of the third solvent in the total amount T of the solvents is preferably in a range of $3/10 \leq (m+d)/T \leq 9/10$ and more preferably $5/10 \leq (m+d)/T \leq 8/10$.

Any electrolytes used in secondary batteries may be used together with the above nonaqueous solvents in the present invention. A preferred electrolyte is $LiPF_6$. Examples of other usable electrolytes include $LiClO_4$, $LiAsF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl, and LiBr. These electrolytes may be used alone or in combination.

Examples of the nonaqueous secondary battery in accordance with the present invention will now be described with reference to FIG. 1. Of course, the present invention is not limited to these Examples.

EXAMPLE 1

A negative electrode 1 was prepared as follows. Coal pitch and petroleum pitch were mixed and were then formed under pressure. The product was heated to 500° C. in an atmosphere of inert gas and was then pulverized, and then the pulverized product was classified. The classified particles were heated to 1,000° C. in an atmosphere of inert gas to form a graphite precursor. The precursor was heated to 200° C. for 20 hours in a hermetically sealed oxygen chamber, and was then heated to 2,950° C. for 1 hour in an atmosphere of inert gas.

A mixture of 90 parts by weight of the resulting carbonaceous particles and 10 parts by weight of polyvinylidene fluoride (PVDF) as a binder was prepared as a negative electrode compound. The compound was dispersed into N-methylpyrrolidone to form a slurry or paste. The slurry was applied onto two faces of a copper foil strip having a thickness of 10 μm as a negative electrode collector, was dried, and was subjected to compact molding to form a strip negative electrode 1.

A positive electrode 2 was prepared as follows. A mixture of 0.5 mole of lithium carbonate and 1 mole of cobalt carbonate was baked at 900° C. for 5 hours in air to form $LiCoO_2$ as a positive electrode active material. A positive electrode compound was prepared by mixing 91 parts by weight of $LiCoO_2$, 6 parts by weight of graphite as a conductive agent, and 3 parts by weight of polyvinylidene fluoride as a binder. The positive electrode compound was dispersed into N-methylpyrrolidone to form a slurry or paste. This slurry was uniformly applied onto two faces of an aluminum foil strip having a thickness of 20 μm as a collector, was dried, and was subjected to compact molding to form a strip positive electrode 2.

The negative electrode 1, a separator 3 composed of a microporous polypropylene film having a thickness of 25 μm, and then the positive electrode 2 were laminated in that order, and the laminate was wound around a center pin 14 by a plurality of turns. The outermost end of the separator 3 was fixed with a tape to form a spiral electrode element.

The resulting electrode element was placed into a battery can 5 in which insulating plates 4 were arranged above and below the electrode elements. A positive electrode lead 13 covered with insulating films was extracted from a positive electrode collector 11 and was welded to a safety valve 8 which is connected to the battery lid 7. A negative electrode lead 12 was extracted from a negative electrode collector 10 and was welded to the battery can 5. The battery can 5 was made of iron and had an outer diameter of 18 mm, an inner diameter of 17.38, a thickness of 0.31 mm, and a height of 65 mm.

The battery can 5 was filled with an electrolyte solution of $LiPF_6$ in an equivolume mixture of ethylene carbonate and dimethyl carbonate in a ratio of 1 mole/liter. The battery can 5 was caulked with a gasket 6 to fix the battery lid 7. A nonaqueous secondary battery having a hermetically sealed structure was thereby prepared.

EXAMPLE 2

Acenaphthylene pitch was heated to 400° C. under a pressure of at least 10 kg/cm² so that a bulk mesophase formed. The product was heated to 500° C. in an atmosphere of inert gas and was pulverized, and then the pulverized product was classified. The classified particles were heated to 1,000° C. in an atmosphere of inert gas to form a graphite precursor. The graphite precursor was heated to 3,050° C. for 1 hour in an atmosphere of inert gas. Using this product as a negative electrode component, a nonaqueous secondary battery was prepared as in Example 1.

EXAMPLE 3

A small amount of sulfuric acid was added to acenaphthylene and the mixture was heated to 400° C. under a pressure of at least 10 kg/cm² so that a bulk mesophase formed. The product was heated to 500° C. in an atmosphere of inert gas and was pulverized, and then the pulverized product was classified. The classified particles were heated to 1,000° C. in an atmosphere of inert gas to form a graphite precursor. The graphite precursor was heated to 3,050° C. for 1 hour in an atmosphere of inert gas. Using this product as a negative electrode component, a nonaqueous secondary battery was prepared as in Example 1.

EXAMPLE 4

A purified natural graphite having a purity of at least 99% was pulverized using a ball mill and was then classified. The pulverized graphite was agitated and was simultaneously irradiated with laser light in air. The graphite was then heated to 2,600° C. for 1 hour in an atmosphere of inert gas. Using this product as a negative electrode component, a nonaqueous secondary battery was prepared as in Example 1.

EXAMPLE 5

A purified natural graphite having a purity of at least 99% was pulverized using a jet mill, and was simultaneously classified by winnowing using an air jet. The pulverized graphite comprised 20% rhombic structures, according to X-ray diffractometry. The pulverized graphite was heated to 2,700° C. for 1 hour in an atmosphere of inert gas. Using this product as a negative electrode component, a nonaqueous secondary battery was prepared as in Example 1.

COMPARATIVE EXAMPLE 1

After mixing coal pitch and petroleum pitch, the mixture was formed under pressure. The product was heated to 500° C. in an atmosphere of inert gas and was pulverized, and then the pulverized product was classified. The classified particles were heated to 1,000° C. in an atmosphere of inert gas to form a graphite precursor. The graphite precursor was heated to 2,950° C. for 1 hour in an atmosphere of inert gas. Using this product as a negative electrode component, a nonaqueous secondary battery was prepared as in Example 1.

COMPARATIVE EXAMPLE 2

Acenaphthylene pitch was heated to 400° C., and when the content of mesophase microspheres reached 50%, these microspheres were isolated from the matrix. The microspheres were heated to 500° C. in an atmosphere of inert gas and was pulverized, and then the pulverized product was classified. The classified particles were heated to 1,000° C. in an atmosphere of inert gas to form a graphite precursor. The graphite precursor was heated to 2,900° C. for 1 hour in an atmosphere of inert gas. Using this product as a negative electrode component, a nonaqueous secondary battery was prepared as in Example 1.

COMPARATIVE EXAMPLE 3

A purified natural graphite having a purity of at least 99% was pulverized using a ball mill and was then classified. Using this product as a negative electrode component, a nonaqueous secondary battery was prepared as in Example 1.

The batteries of Examples 1 to 5 and Comparative Examples 1 to 4 were discharged under conditions of a maximum voltage of 4.2 volts, a constant current of 1 ampere, and a charging time of 3 hours. The charged batteries were stored in an atmosphere at 45° C. for one month, in consideration of the internal temperature of electronic devices during operation. The batteries were discharged to measure discharge capacities thereof and were then charged under the above conditions. The charged batteries were discharged at a discharge current of 1 ampere to determine discharge capacities thereof as recovery capacities. A value of the recovery capacities divided by the discharge capacities after storage was defined as the capacity recovery rate, which is shown in Table 1.

TABLE 1

|  | Capacity Recovery Rate (%) | RG Ratio | Pbb ($cm^{-1}$) | Pba ($cm^{-1}$) | Psb ($cm^{-1}$) | Psa ($cm^{-1}$) |
|---|---|---|---|---|---|---|
| Example 1 | 91.2 | 5.38 | 1352.70 | 1574.81 | 1379.17 | 1604.00 |
| Example 2 | 94.9 | 7.56 | 1353.84 | 1576.90 | 1388.50 | 1581.22 |
| Example 3 | 97.1 | 5.38 | 1352.70 | 1574.81 | 1379.17 | 1604.00 |
| Example 4 | 89.3 | 4.16 | 1349.52 | 1576.60 | 1352.07 | 1583.61 |
| Example 5 | 89.9 | 4.76 | 1351.67 | 1577.88 | 1375.90 | 1603.70 |
| Comparative Example 1 | 80.2 | 4.05 | 1350.21 | 1576.28 | 1356.35 | 1582.31 |
| Comparative Example 2 | 77.3 | 3.99 | 1349.25 | 1576.32 | 1361.48 | 1585.25 |
| Comparative Example 3 | 79.5 | 3.32 | 1347.89 | 1578.39 | 1352.32 | 1580.15 |
| Comparative Example 4 | 79.8 | 4.41 | 1351.58 | 1578.96 | 1351.51 | 1579.74 |

Each carbonaceous electrode material was subjected to Raman spectrometry having a wavelength resolution of 4 $cm^{-1}$ using an argon laser with a wavelength of 514.5 nm. Each carbonaceous electrode material was coated with silver having a thickness of 10 nm by a deposition process and was then tested by surface-enhanced Raman spectrometry as above. The values RG ratio, Pbb, Pba, Psb, and Pas of each sample were determined from these spectra. The results are shown in Table 1.

Figure 2:
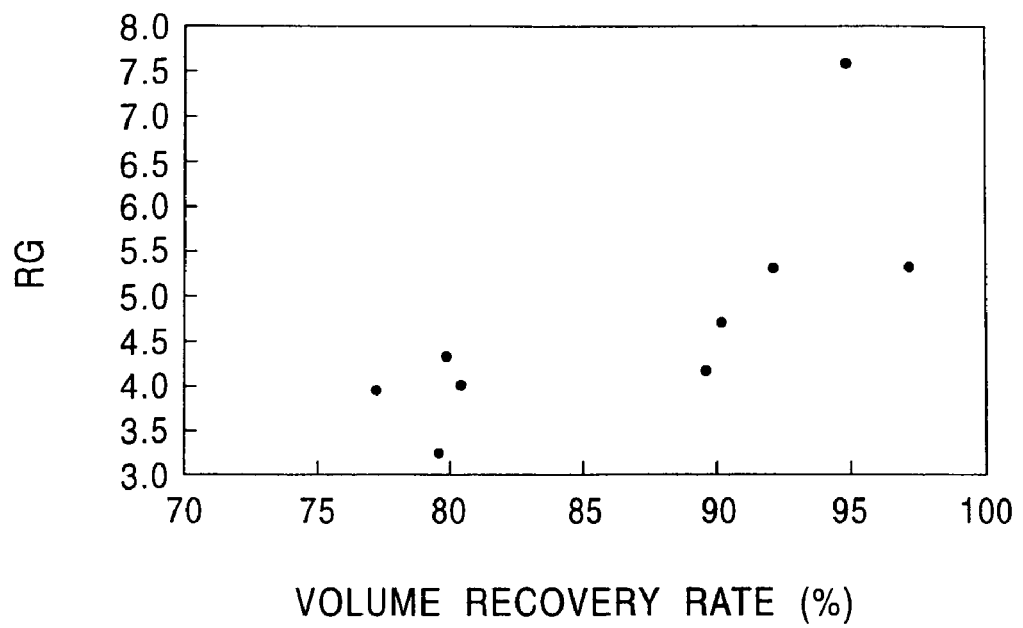
FIG. 2 is a graph of the relationship between the RG ratio and the capacity recovery rate.

FIG. 2 is a graph of the relationship between the RG ratio and the capacity recovery rate. The capacity recovery rate increases in proportion to the RG ratio. In particular, the capacity recovery rate is higher than 85% at an RG ratio above 4.5. The results suggest that a decrease in capacity after storage in high temperature environments can be suppressed.

Figure 3:
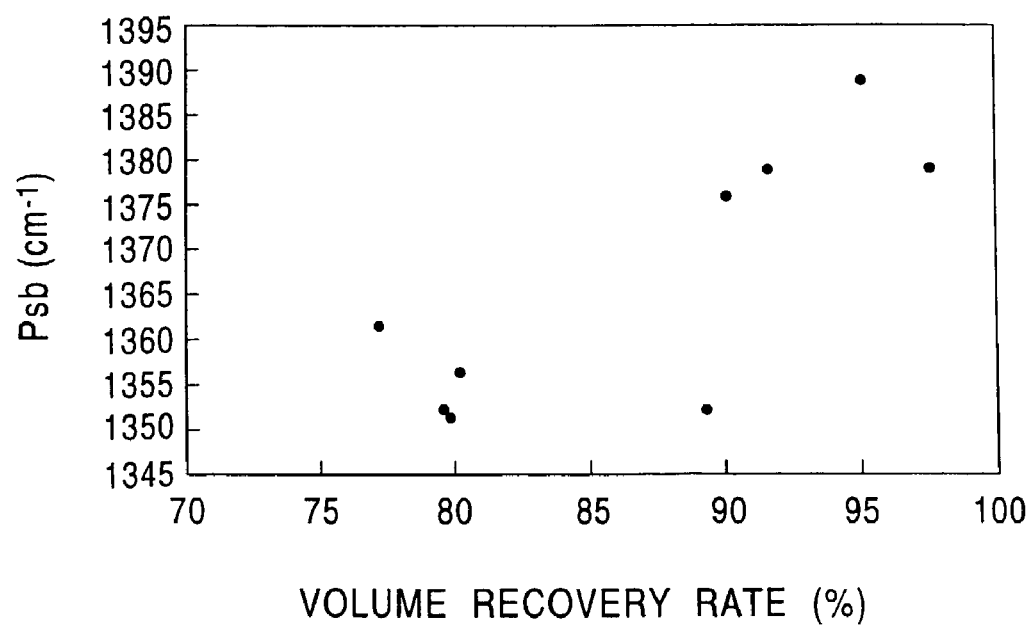
FIG. 3 is a graph of the relationship between the Psb value and the capacity recovery rate.

FIG. 3 is a graph of the relationship between the Psb value and the capacity recovery rate. The capacity recovery rate increases in proportion to the $H_{sb}$ value. In particular, the capacity recovery rate is higher than 85% at an $H_{sb}$ value above 1365. The results suggest that a decrease in capacity after storage in high temperature environments can be suppressed.

As described above, the ratio RG=Gs/Gb of the degree of graphitization Gs of the carbonaceous material, determined by a surface-enhanced Raman spectrum, to the degree of graphitization Gb, determined by a Raman spectrum measured using argon laser light, is limited to be at least 4.5 in the present invention so as to suppress a decrease in the capacity of a nonaqueous secondary battery using the carbonaceous material as a negative electrode component after storage in high-temperature environments. Also, a carbonaceous material having a peak in a wavelength range above 1,360 cm$^{-1}$ in a surface-enhanced Raman spectrum which is measured using an argon laser Raman spectrometer of a wavelength of 514.5 nm may be used in the present invention so as to suppress a decrease in the capacity of a nonaqueous secondary battery using the carbonaceous material as a negative electrode component after storage in high-temperature environments.

What is claimed is:

1. A method for making a negative electrode carbonaceous material comprising the steps of:
   (a) carbonizing a raw material,
   (b) heating the product of step (a) at a temperature of at most 200°, in the presence of an oxidizer; and
   (c) graphitizing the product of step (b), wherein a ratio RG=Gs/Gb of the product of step (c) is at least 4.5, wherein:

$Gb=Hbb/Hba$; and $Gs=Hsb/Hsa$;

wherein:
   Hba is the height of a peak lying in a range of 1,580 cm$^{-1}$ to 1,620 cm$^{-1}$ in a first Raman spectrum, said first Raman spectrum being measured by means of an argon laser Raman spectrometer of a wavelength of 514.5 nm and a wavelength resolution of 4 cm$^{-1}$;
   Hbb is the height of a peak lying in a range of 1,350 cm–1 to 1,400 cm–1 in a second Raman spectrum, said second Raman spectrum being measured by means of an argon laser Raman spectrometer of a wavelength of 514.5 nm and a wavelength resolution of 4 cm$^{-1}$;
   Hsa is the height of a peak lying in a range of 1,580 cm$^{-1}$ to 1,620 cm$^{-1}$ in a first surface-enhanced Raman spectrum, said first surface-enhanced Raman spectrum being measured by means of an argon laser Raman spectrometer of a wavelength of 514.5 nm and a wavelength resolution of 4 cm$^{-1}$ when silver having a thickness of 10 nm is deposited on the product of step c.; and
   Hsb is the height of a peak lying in a range of 1,350 cm$^{-1}$ to 1,400 cm$^{-1}$ in a second surface-enhanced Raman spectrum, said second surface-enhanced Raman spectrum being measured by means of an argon laser Raman spectrometer of a wavelength of 514.5 nm and a wavelength resolution of 4 cm$^{-1}$ when silver having a thickness of 10 nm is deposited on the product of step c.

2. A method for making a negative electrode carbonaceous material, comprising the steps of:
   (a') carbonizing a raw material,
   (b') heating the product of step (a') to a temperature of at most 200° C. in the presence of an oxidizer; and
   (c') graphitizing the product of step (b'), wherein a surface-enhanced Raman spectrum of the product of step (c') comprises a peak in a wavelength range above 1,360 cm$^{-1}$, said surface-enhanced Raman spectrum being measured by means of an argon laser Raman spectrometer of a wavelength of 514.5 nm and a wavelength resolution of 4 cm$^{-1}$ when silver having a thickness of 10 nm is deposited on the product of step c'.

* * * * *